US012720041B2

(12) United States Patent
Gao et al.

(10) Patent No.: US 12,720,041 B2
(45) **Date of Patent: *Aug. 25, 2026**

(54) VIDEO ENCODING METHOD, VIDEO DECODING METHOD, AND RELATED APPARATUSES

(71) Applicant: Tencent Technology (Shenzhen) Company Limited, Shenzhen (CN)

(72) Inventors: Xinwei Gao, Shenzhen (CN); Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 145 days.

This patent is subject to a terminal disclaimer.

(21) Appl. No.: 18/666,681

(22) Filed: May 16, 2024

(65) Prior Publication Data

US 2024/0305776 A1 Sep. 12, 2024

Related U.S. Application Data

(63) Continuation of application No. 17/503,161, filed on Sep. 17, 2021, now Pat. No. 12,015,763, which is a (Continued)

(30) Foreign Application Priority Data

Sep. 27, 2019 (CN) ......................... 201910927098.8

(51) Int. Cl.

*H04N 19/105* (2014.01)
*H04N 19/132* (2014.01)

(Continued)

(52) U.S. Cl.

CPC ......... *H04N 19/105* (2014.11); *H04N 19/132* (2014.11); *H04N 19/176* (2014.11); *H04N 19/30* (2014.11); *H04N 19/46* (2014.11)

(58) Field of Classification Search

CPC .. H04N 19/105; H04N 19/132; H04N 19/176; H04N 19/30; H04N 19/46;

(Continued)

(56) References Cited

U.S. PATENT DOCUMENTS

| | | | |
|---|---|---|---|
| 8,831,089 | B1 | 9/2014 | Zhang |
| 2012/0051440 | A1 | 3/2012 | Parfenov et al. |

(Continued)

FOREIGN PATENT DOCUMENTS

| | | | |
|---|---|---|---|
| CN | 108833916 | A | 11/2018 |
| CN | 109600615 | A | 4/2019 |

(Continued)

OTHER PUBLICATIONS

Machine Translation of CN 109660796A. (Year: 2019).*

(Continued)

*Primary Examiner* — Matthew K Kwan
(74) *Attorney, Agent, or Firm* — Morgan, Lewis & Bockius LLP

(57) ABSTRACT

A video decoding method is performed by an electronic device. The method includes: determining a current video frame; obtaining a target quantity of blocks that are decoded in a skip mode in a reference frame corresponding to the current video frame and a total block quantity of blocks in the reference frame; determining a target resolution used for decoding the current video frame according to a determination whether a ratio of the total block quantity to the target quantity is greater than a preset threshold or not; and decoding the current video frame by using the target resolution. For different current video frames, different resolutions used for decoding can be adaptively selected, to simplify operations of determining the target resolution for decoding the current video frame, thereby resolving the technical problem of relatively low video encoding and (Continued)

decoding efficiency caused by complex processing operations in the related art.

17 Claims, 11 Drawing Sheets

Related U.S. Application Data continuation of application No. PCT/CN2020/116752, filed on Sep. 22, 2020.

(51) Int. Cl.

| | |
|---|---|
| ***H04N 19/176*** | (2014.01) |
| ***H04N 19/30*** | (2014.01) |
| ***H04N 19/46*** | (2014.01) |

(58) Field of Classification Search

CPC .... H04N 19/70; H04N 19/159; H04N 19/172; H04N 19/44

USPC .................................................... 375/240.02

See application file for complete search history.

(56) References Cited

U.S. PATENT DOCUMENTS

| | | | |
|---|---|---|---|
| 2019/0098333 A1 | 3/2019 | Laroche et al. | |
| 2022/0060691 A1 | 2/2022 | Gao et al. | |
| 2022/0217341 A1* | 7/2022 | Xu ...................... | H04N 19/132 |

FOREIGN PATENT DOCUMENTS

| | | |
|---|---|---|
| CN | 109618159 A | 4/2019 |
| CN | 109660796 A | 4/2019 |
| CN | 110545433 A | 12/2019 |

OTHER PUBLICATIONS

Tencent Technology, ISR/WO, PCT/CN2020/116752, Dec. 31, 2020, 7 pgs.

Tencent Technology, IPRP, PCT/CN2020/116752, Mar. 15, 2022, 5 pgs.

Kiyofumi Abe et al., "CABAC skip mode", Joint Video Exploration Team (JVET) of TU-T SG 16 WP 3 and ISO/IEC JTC 1/SC 29/ WG 11, 15th Meeting: Gothenburg, SE, Jul. 3-12, 2019, 2 pgs., Retrieved from the Internet: http://phenix.itsudparis.eu/ivet/doc_end_user/current_document.php?id=6913.

* cited by examiner

VIDEO ENCODING METHOD, VIDEO DECODING METHOD, AND RELATED APPARATUSES

CROSS-REFERENCE TO RELATED APPLICATIONS

This application is a continuation application of U.S. application Ser. No. 17/503,161, entitled "VIDEO ENCODING METHOD, VIDEO DECODING METHOD, AND RELATED APPARATUSES" filed on Sep. 17, 2021, which is a continuation application of PCT Patent Application No. PCT/CN2020/116752, entitled "VIDEO ENCODING METHOD, VIDEO DECODING METHOD, AND RELATED APPARATUSES" filed on Sep. 22, 2020, which claims priority to Chinese Patent Application No. 201910927098.8, entitled "VIDEO ENCODING METHOD AND APPARATUS, VIDEO DECODING METHOD AND APPARATUS, AND STORAGE MEDIUM" filed with the China National Intellectual Property Administration on Sep. 27, 2019, all of which are incorporated herein by reference in their entirety.

This application is related to (i) U.S. Pat. No. 11,849,127, entitled "VIDEO ENCODING METHOD, VIDEO DECODING METHOD, AND RELATED APPARATUSES," (ii) U.S. Pat. No. 11,979,577, entitled "VIDEO ENCODING METHOD, VIDEO DECODING METHOD, AND RELATED APPARATUSES," and (iii) U.S. application Ser. No. 17/503,164, entitled "VIDEO ENCODING METHOD, VIDEO DECODING METHOD, AND RELATED APPARATUSES," filed on Sep. 17, 2021, all of which are incorporated by reference in their entirety.

FIELD OF THE TECHNOLOGY

This application relates to the field of audio and video encoding and decoding, and in particular, to video encoding and video decoding.

BACKGROUND OF THE DISCLOSURE

With the development of digital media technologies and computer technologies, videos are applied to various fields such as mobile communication, online surveillance, and online television. With the improvement of hardware performance and screen resolution, users' demand for high-definition videos is increasing.

Under the condition of limited mobile transmission bandwidth, a codec usually encodes and decodes a video frame by using the same resolution, resulting in a relatively low peak signal to noise ratio (PSNR) in partial transmission bandwidth. For example, when the codec uses a high resolution under a small transmission bandwidth, the PSNR is relatively small while the distortion of the image frames is relatively large. Similarly, when the codec uses a low resolution under a high transmission bandwidth, the PSNR is also relatively small while the distortion of the image frames is relatively large.

SUMMARY

Embodiments of this application provide a video encoding method, a video decoding method, and related apparatuses, to resolve at least the technical problem mentioned in the related art.

According to an aspect of the embodiments of this application, a video decoding method is provided, performed by an electronic device, the method including: determining a current video frame; determining a reference frame corresponding to the current video frame from video frames that have been decoded, and obtaining a target quantity of blocks that are decoded in a skip mode in the reference frame and a total block quantity of blocks in the reference frame; determining, according to a relationship between the target quantity and the total block quantity, a target resolution used for decoding the current video frame; and decoding the current video frame by using the target resolution.

According to another aspect of the embodiments of this application, a video encoding method is provided, performed by an electronic device, the method including: determining a current video frame; determining a reference frame corresponding to the current video frame from video frames that have been encoded, and obtaining a target quantity of blocks that are encoded in a skip mode in the reference frame and a total block quantity of blocks in the reference frame; determining, according to a relationship between the target quantity and the total block quantity, a target resolution used for encoding the current video frame; and encoding the current video frame by using the target resolution.

According to still another aspect of the embodiments of this application, an electronic device is provided, including: a decoding determining module, configured to determine a current video frame; an obtaining module, configured to: determine a reference frame corresponding to the current video frame from video frames that have been decoded, and obtain a target quantity of blocks that are decoded in a skip mode in the reference frame and a total block quantity of blocks in the reference frame; a first processing module, configured to determine, according to a relationship between the target quantity and the total block quantity, a target resolution used for decoding the current video frame; and a decoding module, configured to decode the current video frame by using the target resolution.

According to still another aspect of the embodiments of this application, an electronic device is provided, including: an encoding determining module, configured to determine a current video frame; an obtaining module, configured to: determine a reference frame corresponding to the current video frame from video frames that have been encoded, and obtain a target quantity of blocks that are encoded in a skip mode in the reference frame and a total block quantity of blocks in the reference frame; a processing module, configured to determine, according to a relationship between the target quantity and the total block quantity, a target resolution used for encoding the current video frame; and an encoding module, configured to encode the current video frame by using the target resolution.

According to still another aspect of the embodiments of this application, a non-transitory computer-readable storage medium is further provided, storing computer-readable instructions the computer-readable instructions, when executed by a processor of an electronic device, causing the electronic device to perform the video decoding method or the video encoding method according to the foregoing aspects.

According to still another aspect of the embodiments of this application, an electronic device is provided, including: a processor, a communication interface, a memory, and a communication bus, the processor, the communication interface, and the memory communicating with each other by using the communication bus; the communication interface being an interface of a communication module; the memory being configured to store computer-readable instructions, wherein the computer-readable instructions, when executed by the processor, cause the electronic device to perform the video decoding method or the video encoding method according to the foregoing aspects.

According to still another aspect of the embodiments of this application, a computer program product including instructions is provided, the instructions, when run on a computer, causing the computer to perform the video decoding method or the video encoding method according to the foregoing aspects.

In the embodiments of this application, for a determined current video frame, a reference frame corresponding to the current video frame may be determined from video frames that have been decoded, a target quantity of blocks that are decoded in a skip mode in the reference frame and a total block quantity of blocks in the reference frame are obtained, a target resolution used for decoding the current video frame is determined by using a relationship between the target quantity and the total block quantity of blocks in the reference frame, and the current video frame is decoded by using the target resolution. For different current video frames, different resolutions used for decoding may be adaptively selected, to simplify operations of determining the target resolution used for decoding the current video frame, thereby overcoming the problem of relatively low video decoding efficiency in the related art and achieving the effect of improving decoding efficiency. Further, the technical problem of relatively low video encoding and decoding efficiency caused by complex processing operations provided in the related art is resolved.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to an aspect of the embodiments of this application, a video decoding method is provided. In one implementation, the video decoding method is applicable to, but is not limited to, an application environment shown in FIG. 1. The application environment includes a terminal 102 and a server 104. The terminal 102 and the server 104 communicate with each other by using a network. The terminal 102 may be, but is not limited to, a smartphone, a tablet computer, a laptop computer, a desktop computer, or the like, but is not limited thereto. The server 104 may be, but is not limited to, a computer processing device having a relatively strong data processing capability and a particular storage space.

Figure 1:
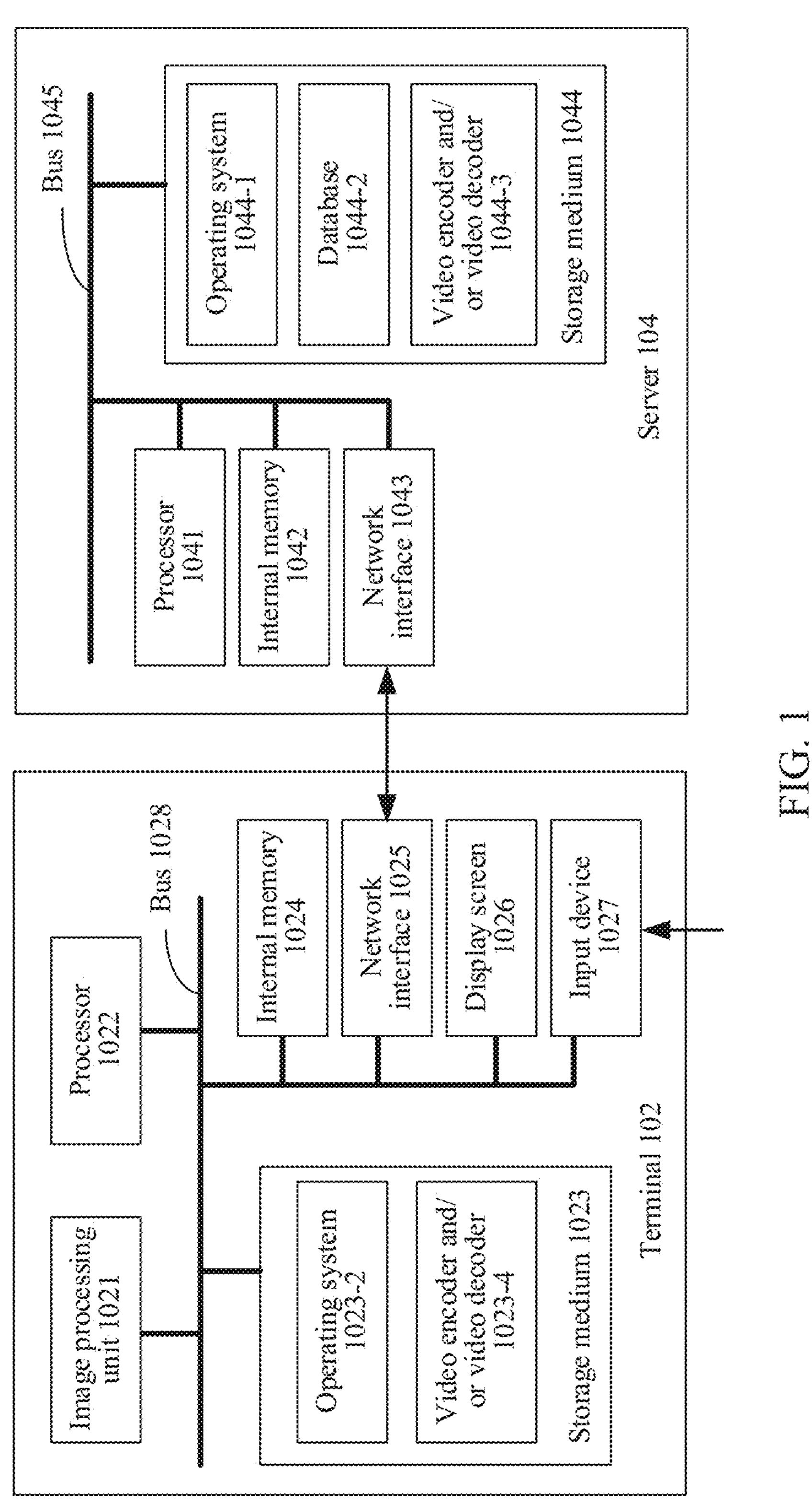
FIG. 1 is a schematic diagram of an application environment of an exemplary video decoding method according to an embodiment of this application.

The video encoding method corresponding to the video decoding method is alternatively applicable to, but is not limited to, the application environment shown in FIG. 1. After a current video is obtained, the video encoding method provided in this application may be used, but is not limited thereto. Resolutions used to encode video frames in different current videos are adaptively determined through an interaction process between the terminal 102 and the server 104 shown in FIG. 1, so that different video frames are encoded by using targeted resolutions, thereby saving the transmission bandwidth and ensuring the encoding quality of a video frame, to avoid the problem of distortion. In addition, after a current video is obtained, the video decoding method provided in this application may be alternatively used, but is not limited thereto. Resolutions used to decode video frames in different current videos are adaptively determined through an interaction process between the terminal 102 and the server 104 shown in FIG. 1, so that different video frames are decoded by using targeted resolutions, thereby ensuring the decoding quality of a video frame, to avoid the problem of distortion.

In an embodiment, the terminal 102 may include, but is not limited to, the following components: an image processing unit 1021, a processor 1022, a storage medium 1023, an internal memory 1024, a network interface 1025, a display screen 1026, and an input device 1027. The components may be connected by, but is not limited to, a system bus 1028. The image processing unit 1021 is configured to provide at least a drawing capability of a display interface. The processor 1022 is configured to provide computing and control capabilities, to support operation of the terminal 102. An operating system 1023-2 and a video encoder and/or a video decoder 1023-4 are stored in the storage medium 1023. The operating system 1023-2 is configured to provide a control operation instruction, and the video encoder and/or the video decoder 1023-4 is configured to perform an encoding/decoding operation according to the control operation instruction. In addition, the internal memory provides an operation environment for the video encoder and/or the video decoder 1023-4 in the storage medium 1023. The network interface 1025 is configured to perform network communication with a network interface 1043 in the server 104. The display screen is configured to display an application interface such as a video decoding interface. The input device 1027 is configured to receive a command, data, or the like entered by a user. For the terminal 102 having a touchscreen, the display screen 1026 and the input device 1027 may be the touchscreen. The internal structures of the terminal shown in FIG. 1 are merely block diagrams of partial structures related to a solution in this application, and do not constitute a limitation to the terminal to which the solution in this application is applied. Specifically, the terminal or the server may include more components or fewer components than those shown in the figures, or some components may be combined, or a different component deployment may be used.

In an embodiment, the server 104 may include, but is not limited to, the following components: a processor 1041, an internal memory 1042, a network interface 1043, and a storage medium 1044. The components may be connected by, but is not limited to, a system bus 1045. The storage medium 1044 includes an operating system 1044-1, a database 1044-2, a video encoder and/or a video decoder 1044-3. The processor 1041 is configured to provide computing and control capabilities, to support operation of the server 104. The internal memory 1042 provides an environment for operation of the video encoder and/or the video decoder 1044-3 in the storage medium 1044. The network interface 1043 is configured to connect to and communicate with the network interface 1025 of the external terminal 102 by using a network. The operating system 1044-1 in the storage medium is configured to provide a control operation instruction. The video encoder and/or the video decoder 1044-3 is configured to perform an encoding/decoding operation according to the control operation instruction. The database 1044-2 is configured to store data. The internal structures of the server shown in FIG. 1 are merely block diagrams of partial structures related to a solution in this application, and do not constitute a limitation to a computer device to which the solution in this application is applied. Specifically, the computer device has different component configurations.

In an embodiment, the network may include, but is not limited to, a wired network. The wired network may include, but is not limited to: a wide area network, a metropolitan area network, and a local area network. The foregoing is merely an example, and this is not limited in this embodiment.

Figure 2:
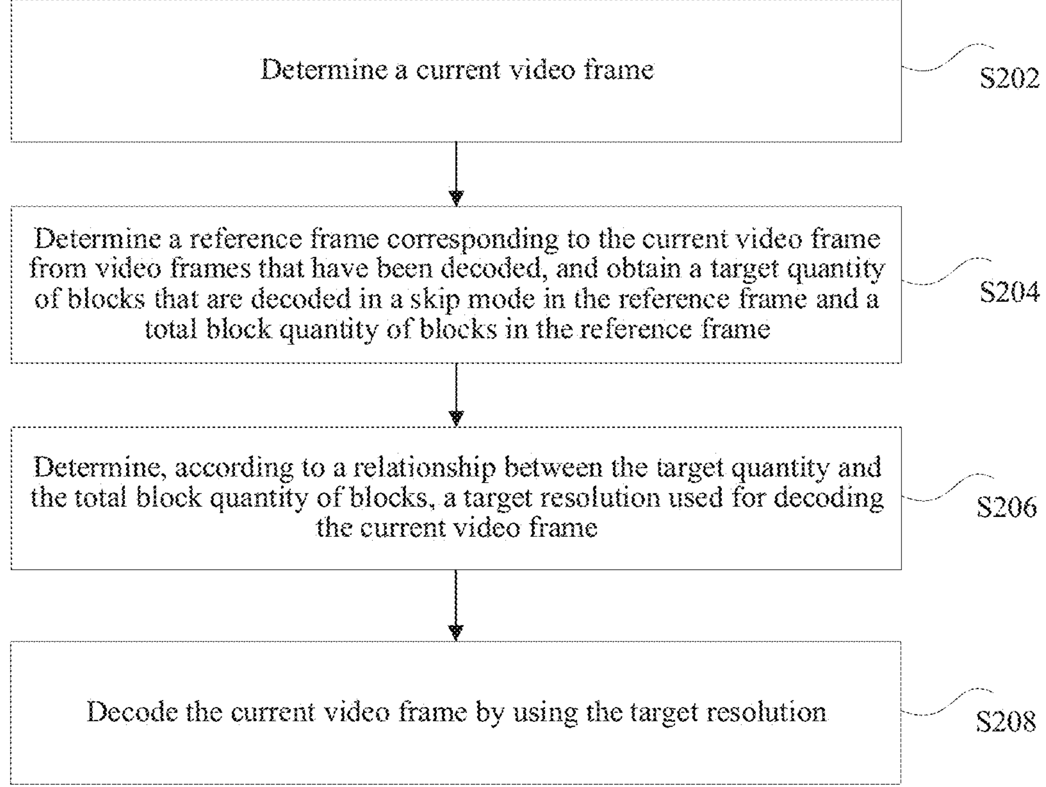
FIG. 2 is a flowchart of an exemplary video decoding method according to an embodiment of this application.

In one implementation, as shown in FIG. 2, the video decoding method includes the following steps:

S202: Determine a current video frame.

S204: Determine a reference frame corresponding to the current video frame from video frames that have been decoded, and obtain a target quantity of blocks that are decoded in a skip mode in the reference frame and a total block quantity of blocks in the reference frame.

S206: Determine, according to a relationship between the target quantity in the reference frame and the total block quantity of blocks in the reference frame, a target resolution used for decoding the current video frame.

S208: Decode the current video frame by using the target resolution.

The video decoding method shown in FIG. 2 is applicable to, but is not limited to, the video decoder shown in FIG. 1. A decoding process of the current video frame is completed through interaction and cooperation between the video decoder and another component.

In some embodiments, the video decoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (for example, the playing time is greater than 10 minutes) or a picture presented in a long video session, and the short video may be a voice message exchanged between two or more parties or a video with a relatively short playing time (for example, the playing time is less than or equal to 30 seconds) presented on a sharing platform. The foregoing is merely an example. The video decoding method provided in this embodiment is applicable to, but is not limited to, a playback device configured to play a video in the application scenario. After video frames that have been decoded are obtained, a target resolution used for decoding a current video frame is adaptively determined based on a relationship between a target quantity in a reference frame determined from the video frames and a total block quantity of blocks in the reference frame, to simplify operations of determining the target resolution used for decoding the current video frame.

In this embodiment, for a determined current video frame, a target quantity in a reference frame associated with the current video frame and a total block quantity of blocks in the reference frame may be obtained from video frames that have been decoded, a target resolution used for decoding the current video frame is determined by using a relationship between the target quantity and the total block quantity, and the current video frame is decoded by using the target resolution. For different current video frames, different resolutions used for decoding may be adaptively selected, to simplify operations of determining the target resolution used for decoding the current video frame, thereby overcoming the problem of relatively low video decoding efficiency in the related art and achieving the effect of improving decoding efficiency.

In some embodiments, after a current video frame is determined from a bitstream received by an encoding device, a reference frame associated with the current video frame may be determined from, but is not limited to, video frames that have been decoded, and a target resolution required for decoding the current video frame is adaptively determined by using a skip mode for the reference frame. A target quantity of blocks that are decoded in the skip mode in the reference frame may be determined by using the skip mode.

The skip mode may include, but not limited to: a P-skip macroblock case and a B-skip macroblock case. A P-skip macroblock case is a special P macroblock and is applied to H.264. For a general P macroblock, both a pixel difference and a motion vector difference (MVD) are written into a bitstream and are transmitted from an encoder side to a decoder side. However, the P-skip macroblock is special in that neither the pixel difference nor the MVD is transmitted (in this case, both the pixel difference and the MVD are 0 and do not need to be transmitted). In addition to transmitting a small quantity of bits used for identifying a macroblock as a P-skip macroblock, the encoder side does not need to transmit other information about the macroblock.

For the decoder side, an MVP may be obtained from a decoder side according to a formula: MVD=MV−MVP when the MVD is zero, to obtain an MV. There is a reconstructed pixel of a macroblock corresponding to a reference frame on the decoder side. A pixel value of the macroblock of this frame may be recovered (if the MV is a fraction, interpolation is required) according to the reconstructed pixel and the MV. This is a so-called P-skip macroblock principle. Literally, the P-skip macroblock principle is understood as that the macroblock is skipped, which is equivalent to that the macroblock is not encoded. An approximate alternative recovery method is adopted on the decoder side. A B-skip macroblock principle is similar to the P-skip macroblock principle, which is processed from front and rear directions. Details are not described herein again.

In some embodiments, the determining, according to a relationship between the target quantity and the total block quantity, a target resolution used for decoding the current video frame may include, but is not limited to: obtaining a reciprocal of a ratio of the target quantity to the total block quantity; and determining the target resolution according to a result of comparison between the reciprocal and a preset threshold. For example, the current video frame is decoded by using a first resolution when the reciprocal is greater than or equal to the preset threshold; and the current video frame is decoded by using a second resolution when the reciprocal is less than the preset threshold, the second resolution being greater than the first resolution. That is, when a quantity of blocks that are decoded in the skip mode is larger, the reciprocal is smaller, and a used resolution is higher.

Moreover, in this embodiment, the determining, according to a relationship between the target quantity and the total block quantity, a target resolution used for decoding the current video frame may alternatively include, but is not limited to: obtaining a difference between the total block quantity of blocks in the reference frame and the target quantity in the reference frame; obtaining a ratio of the difference to the total block quantity, and decoding the current video frame by using a first resolution when the ratio is greater than a preset threshold; and decoding the current video frame by using a second resolution when the ratio is less than the preset threshold, the second resolution being greater than the first resolution. That is, when a quantity of blocks that are decoded in the skip mode is larger, the difference is smaller, a corresponding ratio is smaller, and a used resolution is higher. In comparison, when a quantity of blocks that are decoded in the skip mode is smaller, the difference is larger, a corresponding ratio is larger, and a used resolution is lower. The determining manner is merely an example, and is not limited in this embodiment.

In this embodiment, the first resolution may include, but is not limited to: an original resolution of the current video frame, and a highest resolution obtained by upsampling the current video frame. The second resolution may include, but is not limited to: a resolution obtained by downsampling the first resolution according to a predetermined sampling ratio. The sampling ratio may be determined according to, but is not limited to, a result of comparison between the ratios and different thresholds. The different thresholds herein may be, but are not limited to, a group of thresholds determined from a value interval greater than the preset threshold.

Further, in this embodiment, the reference frame may include, but is not limited to one of the following: one reference frame in video frames that have been decoded and a plurality of reference frames in the video frames that have been decoded. The plurality of reference frames may include, but are not limited to: a plurality of consecutive video frames or a plurality of nonconsecutive video frames in the video frames that have been decoded.

In some embodiments, the adaptively determining a target resolution used for decoding a current video frame may include, but is not limited to the following manner:

(1) Obtain a reciprocal of a ratio of the target quantity to the total block quantity in a manner agreed on with an encoding device, and adaptively determine, based on a result of comparison between the reciprocal and a preset threshold, the target resolution used for decoding the current video frame. For example, the encoder side and the decoder side may determine resolutions used on two sides in the same manner according to an agreement in a communication standard.

(2) Obtain a bitstream sent by the encoding device, and parse the bitstream to obtain a decoding flag bit, the decoding flag bit being used for indicating the target resolution used for decoding the current video frame.

In this embodiment, the decoding device on the decoder side may adaptively determine, in a manner the same as that in the encoding device according to an agreement, a target resolution used for decoding the current video frame, and the manner may be: determining the target resolution based on a result of comparison between a preset threshold and a reciprocal of a ratio of the target quantity to the total block quantity.

In some embodiments, the decoding the current video frame by using the target resolution may include, but is not limited to: after the target resolution used for decoding the current video frame is adaptively determined, decoding the current video frame based on the target resolution by using the related art:

S1: Determine a current decoding mode corresponding to the current video frame. For example, a flag bit corresponding to a preset position in a bitstream is obtained, and information about a current encoding mode is obtained by using the flag bit, thereby determining whether the current decoding mode is a full resolution mode or a downsampling mode. The current decoding mode is the same as the current encoding mode.

S2: Determine a processing reference frame according to a resolution of a current reference frame corresponding to the current video frame and the target resolution of the current video frame obtained through decision-making. It is determined whether the resolution of the current reference frame is the same as the target resolution. If the resolution of the current reference frame is the same as the target resolution, the current reference frame is directly used as the processing reference frame; and if the resolution of the current reference frame is different from the target resolution, step S3 is performed.

S3: Sample the current reference frame according to a preset sampling rule, to obtain the corresponding processing reference frame. The preset sampling rule used during decoding is the same as a preset sampling rule used during encoding. For example, the preset sampling rule used on the encoder side may be related to, but is not limited to, a resolution of a current encoded video frame and a distance between the current reference frame and the current encoded video frame. If a distance D between the current reference frame and the current encoded video frame exceeds a preset threshold, 1/M downsampling is used, or otherwise, 1/N downsampling is used, $M<N$. A reference value of a relatively far reference frame may be less than that of a relatively close reference frame. Therefore, even if the resolution of the relatively far current reference frame is different from that of the current encoded video frame, the relatively far current reference frame may not be sampled, or a resolution change of the relatively far current reference frame after being sampled becomes relatively small. Correspondingly, the decoder side may alternatively perform sampling by using the same method, so that a sampling speed can be accelerated, thereby increasing an entire decoding speed. A value of M varies with the distance D, thereby further improving the flexibility of a sampling parameter.

In addition, if the resolution of the current reference frame is different from a resolution (for example, the target resolution) of a current decoded video frame, the current reference frame is sampled to obtain a processing reference frame having a resolution the same as that of the current decoded video frame. Sampling the current reference frame includes upsampling and downsampling. If the resolution of the current reference frame is greater than that of the current decoded video frame, downsampling is performed on the current reference frame to obtain the processing reference frame. If the resolution of the current reference frame is less than that of the current decoded video frame, upsampling is performed on the current reference frame to obtain the processing reference frame. In an embodiment, if there are a plurality of current reference frames, each current reference frame is sampled according to the resolution of the reference frame and the resolution of the current decoded video frame to obtain a processing reference frame having a resolution the same as that of the current decoded video frame.

Further, in this embodiment, a sampling algorithm used for sampling the current reference frame matches a sampling algorithm used to downsample a reestablished video frame to obtain a decoded video frame. To be specific, if the reference frame is downsampled, a downsampling algorithm is the same as a downsampling algorithm used to downsample the reestablished video frame to obtain the decoded video frame. If the reference frame is upsampled, an upsampling algorithm is a reverse sampling algorithm matching the downsampling algorithm used to downsample the reestablished video frame to obtain the decoded video frame.

S4: Decode a current decoded video frame according to the processing reference frame, to obtain a reestablished video frame. A prediction residual in the bitstream is decoded and is superimposed with a predicted pixel corresponding to the processing reference frame, to obtain a reestablished video frame.

S5: Process the reestablished video frame according to the current decoding mode, to obtain a decoded video frame, upsample the reestablished video frame to obtain the decoded video frame if the current decoding mode is a downsampling mode, and determine the reestablished video frame as the decoded video frame if information about a current encoding mode is a full sampling mode.

Specifically, an algorithm for upsampling the reestablished video frame is a reverse sampling algorithm matching an algorithm used by an encoder side to downsample a current video frame to obtain a current encoded video frame.

In this embodiment, at least one pair of decoding blocks to be reconstructed are determined from the current video frame, each pair of decoding blocks in the at least one pair of decoding blocks including a first decoding block using a first resolution and a second decoding block using a second resolution, the first decoding block and the second decoding block being adjacent decoding blocks; the first resolution of the first decoding block is adjusted to the target resolution, and the second resolution of the second decoding block is adjusted to the target resolution; a first edge pixel set is determined from the first decoding block, and a second edge pixel set is determined from the second decoding block, a position of the first edge pixel set being adjacent to a position of the second edge pixel set; and the first edge pixel set is filtered, to obtain a filtered first edge pixel set, and the second edge pixel set is filtered, to obtain a filtered second edge pixel set, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

The manner of adjusting the target resolution includes one of the following:

(1) adjusting the second resolution to the first resolution when the target resolution is equal to the first resolution;

(2) adjusting the first resolution to the second resolution when the target resolution is equal to the second resolution; and (3) when the target resolution is equal to a third resolution, adjusting the first resolution to the third resolution, and adjusting the second resolution to the third resolution, the third resolution being different from the first resolution and being different from the second resolution.

The resolutions of the decoding blocks are adjusted, and edge filtering is performed on the edge pixel sets determined from the decoding blocks, so that an obvious seam in a video can be avoided during reconstruction, thereby ensuring accurate restoration of content in the video and further resolving the technical problem of video distortion caused by inconsistent resolutions.

According to the embodiments of this application, for a determined current video frame, a target quantity in a reference frame associated with the current video frame and a total block quantity of blocks in the reference frame may be obtained from video frames that have been decoded, a target resolution used for decoding the current video frame is determined by using a relationship between the target quantity and the total block quantity, and the current video frame is decoded by using the target resolution. Therefore, the resolution used for decoding the current video frame is determined by using the relationship between the target quantity and the total block quantity, to adaptively select different resolutions for different current video frames, to simplify operations of determining the target resolution used for decoding the current video frame, thereby overcoming the problem of relatively low video decoding efficiency in the related art and achieving the effect of improving decoding efficiency.

As an exemplary solution, the determining, according to a relationship between the target quantity and the total block quantity, a target resolution used for decoding the current video frame includes the following steps:

(1) decoding the current video frame by using a first resolution when a reciprocal of a ratio of the target quantity to the total block quantity is greater than or equal to a preset threshold; and (2) decoding the current video frame by using a second resolution when the reciprocal of the ratio of the target quantity to the total block quantity is less than the preset threshold, the second resolution being greater than the first resolution.

In this embodiment, the first resolution may include, but is not limited to: an original resolution of the current video frame, and a highest resolution obtained by upsampling the current video frame. The second resolution may include, but is not limited to: a resolution obtained by downsampling the first resolution according to a predetermined sampling ratio. The sampling ratio may be determined according to, but is not limited to, a result of comparison between the ratios and different thresholds. The different thresholds herein may be, but are not limited to, a group of thresholds determined from a value interval greater than the preset threshold.

In some embodiments, before the decoding the current video frame by using a first resolution, the method further includes the following steps:

S1: Determine a group of thresholds from a value interval greater than the preset threshold when the reciprocal of the ratio of the target quantity to the total block quantity is greater than or equal to the preset threshold.

S2: Compare the reciprocal of the ratio of the target quantity to the total block quantity with thresholds included in the group of thresholds.

S3: Determine a sampling ratio according to a result of the comparison.

S4: Downsample the second resolution according to the sampling ratio, to determine the first resolution.

In some embodiments, the determining a sampling ratio according to a result of the comparison includes: obtaining, when it is determined that the reciprocal of the ratio of the target quantity to the total block quantity falls within a target interval, a target sampling ratio configured for the target interval, the target interval including a value between a first threshold and a second threshold that are adjacent in the group of thresholds, the first threshold being less than the second threshold; and the downsampling the second resolution according to the sampling ratio includes: downsampling a width and a height of the second resolution according to the target sampling ratio, to obtain the first resolution.

Specifically, a description is provided with reference to the following example. It is assumed that the preset threshold is A1, the group of thresholds determined from the value interval greater than the preset threshold include: A2 to A5, A2 being less than A3, A3 being less than A4, A4 being less than A5. Further, a ratio of a target quantity M to a total block quantity N is assumed, and a reciprocal of the ratio of the target quantity M to the total block quantity N is calculated: $r=1/(M/N)=N/M$ (that is, a ratio of the total block quantity N to the target quantity M). A determining process may be as follows.

When it is determined that $r<A1$, it indicates that there are a large quantity of same images in the video frames that have been decoded, and correspondingly, the current video frame is decoded by using a high resolution R (for example, the second resolution). When it is determined that $A1<r<A2$, it indicates that there are a small quantity of same images in the video frames that have been decoded, and correspondingly, it may be determined that the sampling ratio is ¾ a width and a height of the high resolution R, and the high resolution R is sampled by using the sampling ratio, to obtain a resolution R' (for example, the first resolution) used for decoding. When it is determined that $A3<r<A4$, it may be determined that the sampling ratio is ⅔ the width and the height of the high resolution R, and the high resolution R is sampled by using the sampling ratio, to obtain the resolution R' (for example, the first resolution) used for decoding. When it is determined that $A4<r<A5$, it may be determined that the sampling ratio is ⅓ the width and the height of the high resolution R, and the high resolution R is sampled by using the sampling ratio, to obtain the resolution R' (for example, the first resolution) used for decoding.

The foregoing sampling ratio is an example, and the interval corresponding to different thresholds may be set to different values. A value of the sampling ratio and a correspondence between the sampling ratios and the thresholds are not limited in this embodiment.

According to the embodiments of this application, a reciprocal of a ratio of a target quantity in a reference frame to a total block quantity of blocks in the reference frame is obtained, so that a resolution matching a current video frame is adaptively selected according to a result of comparison between the reciprocal and a preset threshold, to improve the flexibility of determining the resolution, and a complex determining process is not required, so that the resolutions used for different video frames may be quickly determined during decoding, to improve the decoding efficiency during decoding.

As an exemplary solution, the determining a reference frame corresponding to the current video frame from video frames that have been decoded, and obtaining a target quantity of blocks that are decoded in a skip mode in the reference frame and a total block quantity of blocks in the reference frame includes the following steps:

S1: Determine a $(t-k)^{th}$ video frame as one reference frame when the current video frame is a $t^{th}$ video frame.

S2: Obtain the target quantity and the total block quantity from the $(t-k)^{th}$ video frame, k being a predetermined positive integer, t being a positive integer, t being greater than k.

Figure 3:
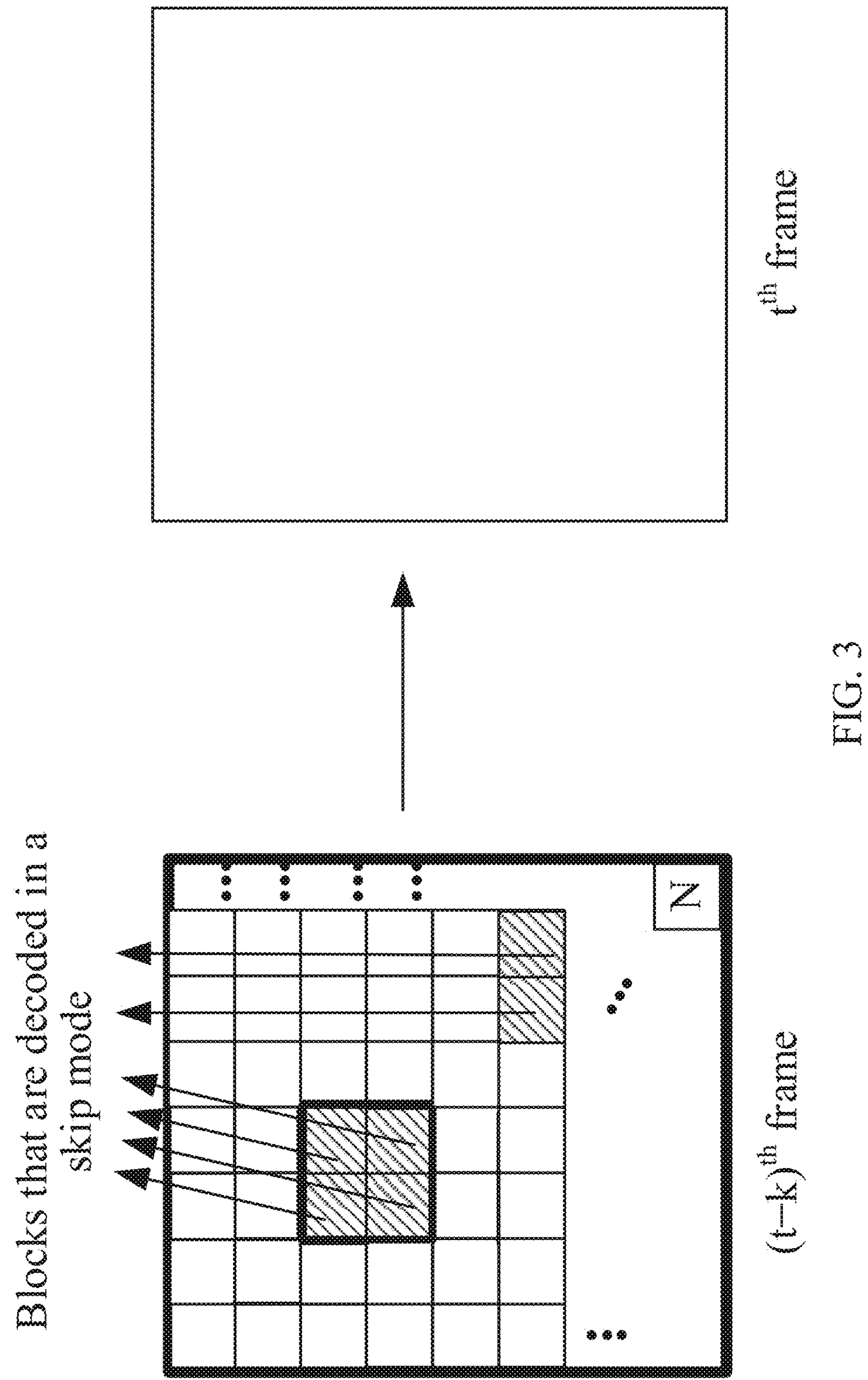
FIG. 3 is a schematic diagram of an exemplary video decoding method according to an embodiment of this application.

Specifically, a description is provided with reference to the example shown in FIG. 3. It is assumed that the current video frame is a $t^{th}$ video frame, and a reference frame is determined from the video frames that have been decoded as a $(t-k)^{th}$ video frame. Further, it is assumed that a target quantity M and a total block quantity N are obtained from the $(t-k)^{th}$ video frame, a reciprocal of a ratio of the target quantity M to the total block quantity N is calculated: $r=1/(M/N)=N/M$ (that is, a ratio of the total block quantity N to the target quantity M), and the reciprocal is compared with a preset threshold.

For example, the reciprocal r is compared with the preset threshold A1. When $r<A1$, it is determined that the current video frame is decoded by using the second resolution R; and when $r>A1$, a group of thresholds are obtained from a value interval greater than A1. It is assumed that the group of thresholds include: A2 to A5, A2 being less than A3, A3 being less than A4, A4 being less than A5. It is assumed that it is determined that A4<r<A5 through comparison; it may be determined that the sampling ratio is ⅓ a width and a height of the high resolution R (for example, the second resolution), and the high resolution R is sampled by using the sampling ratio, to obtain a resolution R' (for example, the first resolution) used for decoding. The $t^{th}$ video frame is decoded by using the resolution R' (for example, the first resolution).

According to the embodiments of this application, after one reference frame is determined from video frames that have been decoded, a target quantity in the reference frame and a total block quantity of blocks in the reference frame are obtained, so that a target resolution corresponding to a current video frame is adaptively selected by using a relationship between the target quantity and the total block quantity for decoding. Therefore, a resolution used for decoding the current video frame is quickly determined, thereby overcoming the problem of relatively low decoding efficiency caused by relatively complex operations of determining the resolution in the related art.

As an exemplary solution, the determining a reference frame corresponding to the current video frame from video frames that have been decoded, and obtaining a target quantity of blocks that are decoded in a skip mode in the reference frame and a total block quantity of blocks in the reference frame includes the following steps:

S1: Determine a plurality of reference frames from the video frames that have been decoded.

S2: Obtain the target quantity in the plurality of reference frames and the total block quantity in the plurality of reference frames.

In some embodiments, the determining a plurality of reference frames from the video frames that have been decoded includes: determining a plurality of consecutive video frames or a plurality of nonconsecutive video frames from the video frames that have been decoded as the plurality of reference frames.

Figure 4:
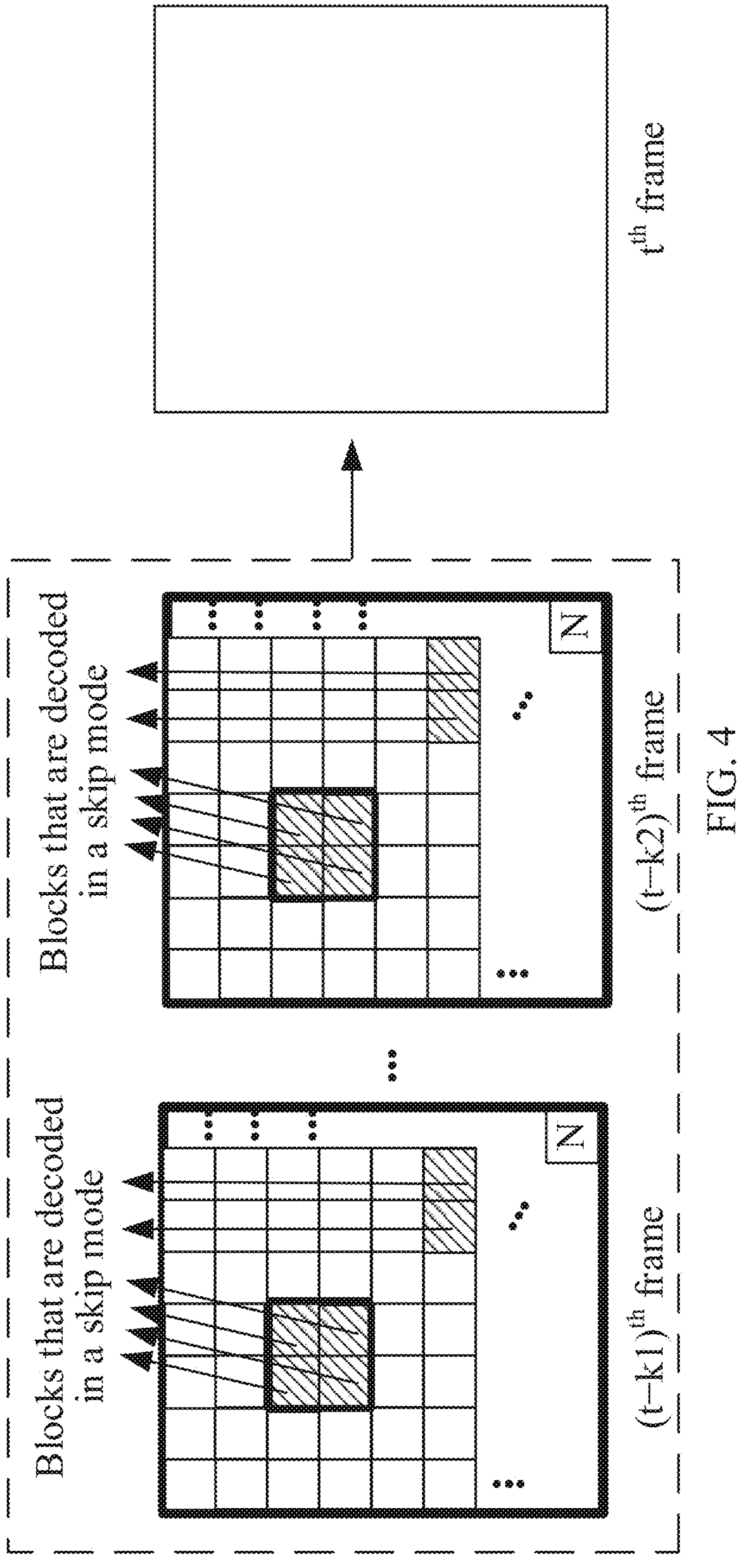
FIG. 4 is a schematic diagram of another exemplary video decoding method according to an embodiment of this application.
Figure 5:
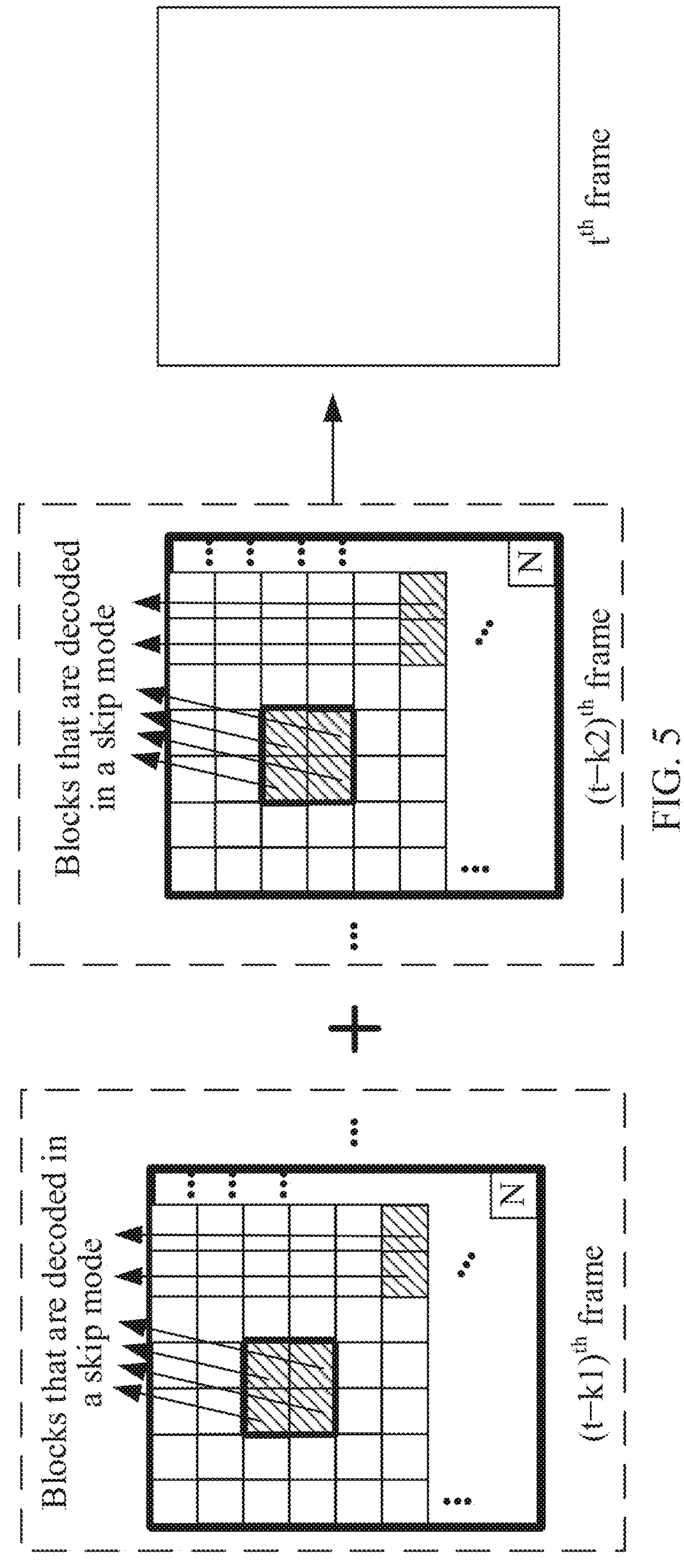
FIG. 5 is a schematic diagram of still another exemplary video decoding method according to an embodiment of this application.

For example, the plurality of reference frames may be consecutive reference frames. A plurality of consecutive video frames from a $(t-k1)^{th}$ video frame to a $(t-k2)^{th}$ video frame shown in FIG. 4 are determined as the plurality of reference frames of the current video frame. A target quantity in the video frames and a total block quantity of blocks in the video frames are obtained from the plurality of consecutive video frames from the $(t-k1)^{th}$ video frame to the $(t-k2)^{th}$ video frame shown in FIG. 4, and a target resolution is determined based on a relationship between the target quantity and the total block quantity determined based on the plurality of consecutive video frames. The plurality of reference frames may be alternatively nonconsecutive reference frames. A plurality of discrete video frames are selected from the $(t-k1)^{th}$ video frame to the $(t-k2)^{th}$ video frame shown in FIG. 5. For example, a group of video frames including the $(t-k1)^{th}$ video frame and a group of video frames including the $(t-k2)^{th}$ video frame are determined as the plurality of reference frames of the current video frame. A target quantity in the video frames and a total block quantity of blocks in the video frames are obtained from the plurality of nonconsecutive video frames from the $(t-k1)^{th}$ video frame to the $(t-k2)^{th}$ video frame shown in FIG. 5, and a target resolution is determined based on a relationship between the target quantity and the total block quantity determined based on the plurality of nonconsecutive video frames. In the plurality of reference frames, total block quantities of blocks in the reference frames may be the same value such as N (as shown in FIG. 4 and FIG. 5) or may be different values such as N1, N2, . . . (not shown in the figure). This is not limited in this embodiment.

The parameters k1 and k2 may be, but are not limited to, parameters agreed on with the encoding device on the encoder side in advance, or may be parameters determined by parsing a flag bit at a specified position in a bitstream. This is not limited in this embodiment.

In some embodiments, step S1 of determining a plurality of reference frames from the video frames that have been decoded includes: determining a $(t-k1)^{th}$ video frame to a $(t-k2)^{th}$ video frame as the plurality of reference frames when the current video frame is a $t^{th}$ video frame; and step S2 of obtaining the target quantity in the plurality of reference frames and the total block quantity in the plurality of reference frames includes: obtaining the target quantity and the total block quantity from the $(t-k1)^{th}$ video frame to the $(t-k2)^{th}$ video frame, k1 and k2 being predetermined positive integers, t being a positive integer, t being greater than k1, k1 being greater than k2.

Figure 6:
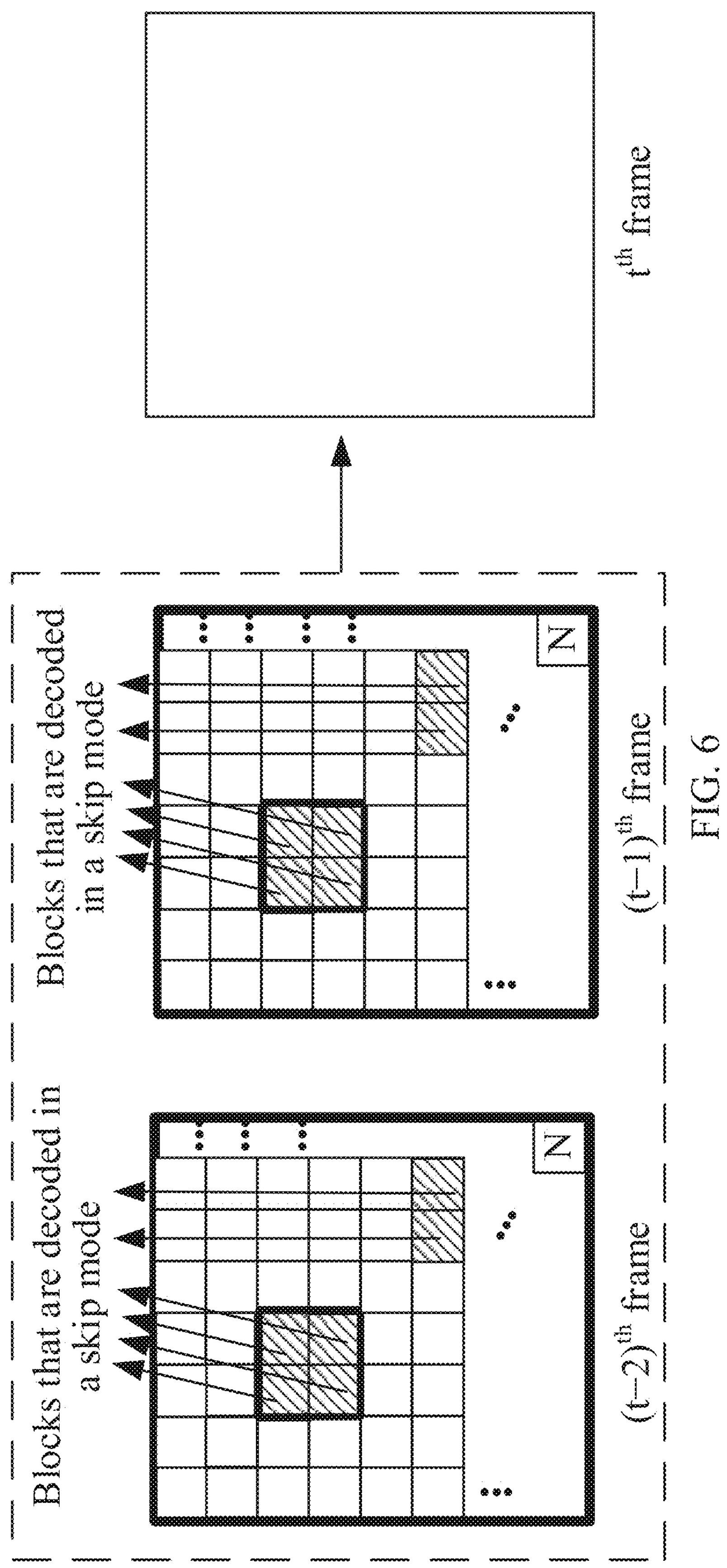
FIG. 6 is a schematic diagram of still another exemplary video decoding method according to an embodiment of this application.

Specifically, a description is provided with reference to the example shown in FIG. 6. It is assumed that the plurality of reference frames are a plurality of consecutive video frames from a $(t-1)^{th}$ video frame to a $(t-2)^{th}$ video frame, a total block quantity of blocks in each reference frame being N. Further, a target quantity M1 is obtained from the $(t-1)^{th}$ frame, a target quantity M2 is obtained from the $(t-2)^{th}$ frame, and a ratio t may be determined by using, but is not limited to, the following formula:

$$t = M1/N + M2/N; \tag{1}$$

$$t = [M1*a + M2*b]/N, \tag{2}$$

a and b being weights required for calculation, specific values of a and b being not limited; and $$t = [M1 + M2]/[N + N]. \tag{3}$$

A reciprocal r is obtained based on the ratio t, and a target resolution is further determined based on a result of comparison between the reciprocal r and a preset threshold. The formula is merely an example and is not limited in this embodiment.

According to the embodiments of this application, after a plurality of reference frames are determined from video frames that have been decoded, a relationship between a target quantity in the plurality of reference frames and a total block quantity in the plurality of reference frames are obtained, to adaptively select a target resolution corresponding to a current video frame for decoding. Therefore, a resolution used for decoding the current video frame is quickly determined, thereby overcoming the problem of relatively low decoding efficiency caused by relatively complex operations of determining the resolution in the related art.

As an exemplary solution, the determining a target resolution further includes the following steps:

S1: Parse a bitstream to obtain a decoding flag bit corresponding to the current video frame.

S2: Obtain the target resolution indicated by the decoding flag bit.

To simplify operations of determining the target resolution on the decoder side, the encoder side may further directly write the target resolution determined by the encoding device in the determining manner into a bitstream in a manner of flag bit. The decoding device on the decoder side may directly obtain the determined target resolution after parsing the decoding flag bit from the bitstream.

The decoding flag bit may be indicated by, but is not limited to, the following syntax elements:

(1) obtaining a syntax element corresponding to each current video frame, the syntax element being used for indicating a resolution used for decoding the current video frame, a plurality of resolutions used for decoding a plurality of current video frames including at least two different resolutions; and (2) obtaining a syntax element corresponding to each current video frame in a plurality of current video frames, the syntax element being used for indicating a relationship between a first resolution and a second resolution, the first resolution being a resolution used for decoding the current video frame, the second resolution being a resolution used for decoding a reference frame of the current video frame, a plurality of resolutions used for decoding the plurality of current video frames including at least two different resolutions; and determining the first resolution corresponding to each region according to the syntax element and the second resolution.

In this way, regardless of whether transmission bandwidth is relatively small or is relatively large, a corresponding PSNR is relatively large, and distortion is relatively small, thereby ensuring that the PSNR can change within a relatively small range, and the PSNR is relatively large, thereby achieving the technical effect of avoiding a relatively large fluctuation of the PSNR for encoding and decoding a video.

According to the embodiments of this application, a determined target resolution required by decoding is directly obtained by using a decoding flag bit, to simplify a processing process of a decoder side, thereby reducing overheads during transmission and the decoding complexity of the decoder side and further achieving the effect of improving decoding efficiency.

Figure 7:
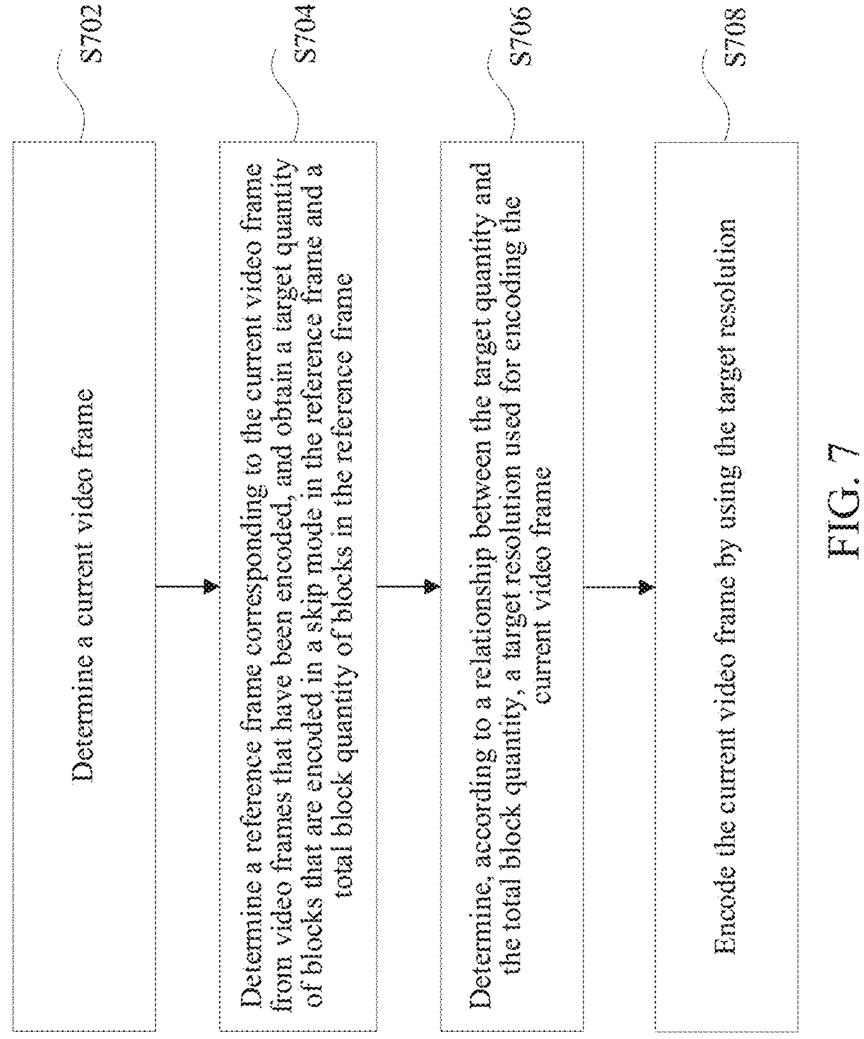
FIG. 7 is a flowchart of an exemplary video encoding method according to an embodiment of this application.

In one implementation, as shown in FIG. 7, the video encoding method includes the following steps:

S702: Determine a current video frame.

S704: Determine a reference frame corresponding to the current video frame from video frames that have been encoded, and obtain a target quantity of blocks that are encoded in a skip mode in the reference frame and a total block quantity of blocks in the reference frame.

S706: Determine, according to a relationship between the target quantity and the total block quantity, a target resolution used for encoding the current video frame.

S708: Encode the current video frame by using the target resolution.

The video encoding method shown in FIG. 7 is applicable to, but is not limited to, the video encoder shown in FIG. 1. An encoding process of the current video frame is completed through interaction and cooperation between the video encoder and another component.

In some embodiments, the video encoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (for example, the playing time is greater than 10 minutes) or a picture presented in a long video session, and the short video may be a voice message exchanged between two or more parties or a video with a relatively short playing time (for example, the playing time is less than or equal to 30 seconds) presented on a sharing platform. The foregoing is merely an example. The video encoding method provided in this embodiment is applicable to, but is not limited to, a playback device configured to play a video in the application scenario. After video frames that have been encoded are obtained, a target resolution used for encoding a current video frame is adaptively determined based on a relationship between a target quantity of blocks that are encoded in a skip mode in a reference frame determined from the video frames and a total block quantity of blocks in the reference frame, to simplify operations of determining the target resolution used for encoding the current video frame, thereby overcoming the problem of relatively low video encoding efficiency in the related art and achieving the effect of improving encoding efficiency.

In this embodiment, for a determined current video frame, a target quantity in a reference frame associated with the current video frame and a total block quantity of blocks in the reference frame may be obtained from video frames that have been encoded, a target resolution used for encoding the current video frame is determined by using a relationship between the target quantity and the total block quantity of blocks in the reference frame, and the current video frame is encoded by using the target resolution. Therefore, the resolution used for encoding the current video frame is determined by using the relationship between the target quantity and the total block quantity of blocks in the reference frame, to adaptively select different resolutions for different current video frames, to simplify operations of determining the target resolution used for encoding the current video frame, thereby overcoming the problem of relatively low video encoding efficiency in the related art and achieving the effect of improving encoding efficiency.

In some embodiments, after a current video frame is determined from a bitstream received by an encoding device, a reference frame associated with the current video frame may be determined from, but is not limited to, video frames that have been decoded, and a target resolution required for decoding the current video frame is adaptively determined by using a skip mode for the reference frame. A target quantity of blocks that are decoded in the skip mode in the reference frame may be determined by using the skip mode.

As an exemplary solution, the determining, according to a relationship between the target quantity and the total block quantity, a target resolution used for encoding the current video frame includes the following steps:

(1) encoding the current video frame by using a first resolution when a reciprocal of a ratio of the target quantity to the total block quantity is greater than or equal to a preset threshold; and (2) encoding the current video frame by using a second resolution when the reciprocal of the ratio of the target quantity to the total block quantity is less than the preset threshold, the second resolution being greater than the first resolution.

In some embodiments, before the encoding the current video frame by using a first resolution, the method further includes the following steps:

S1: Determine a group of thresholds from a value interval greater than the preset threshold when the reciprocal of the ratio of the target quantity to the total block quantity is greater than or equal to the preset threshold.

S2: Compare the reciprocal of the ratio of the target quantity to the total block quantity with thresholds included in the group of thresholds.

S3: Determine a sampling ratio according to a result of the comparison.

S4: Downsample the second resolution according to the sampling ratio, to determine the first resolution.

In some embodiments, the determining a sampling ratio according to a result of the comparison includes: obtaining, when it is determined that the reciprocal of the ratio of the target quantity to the total block quantity falls within a target interval, a target sampling ratio configured for the target interval, the target interval including a value between a first threshold and a second threshold that are adjacent in the group of thresholds, the first threshold being less than the second threshold; and the downsampling the second resolution according to the sampling ratio includes: downsampling a width and a height of the second resolution according to the target sampling ratio, to obtain the first resolution.

In this embodiment, for the specific embodiments of the video encoding method, reference may be made to, but is not limited to, the specific embodiments of the video decoding method. To-be-encoded video frames are encoded by using adaptively determined and matched resolutions in a processing manner opposite to the decoding method. In this embodiment, details are not described herein again.

Figure 8:
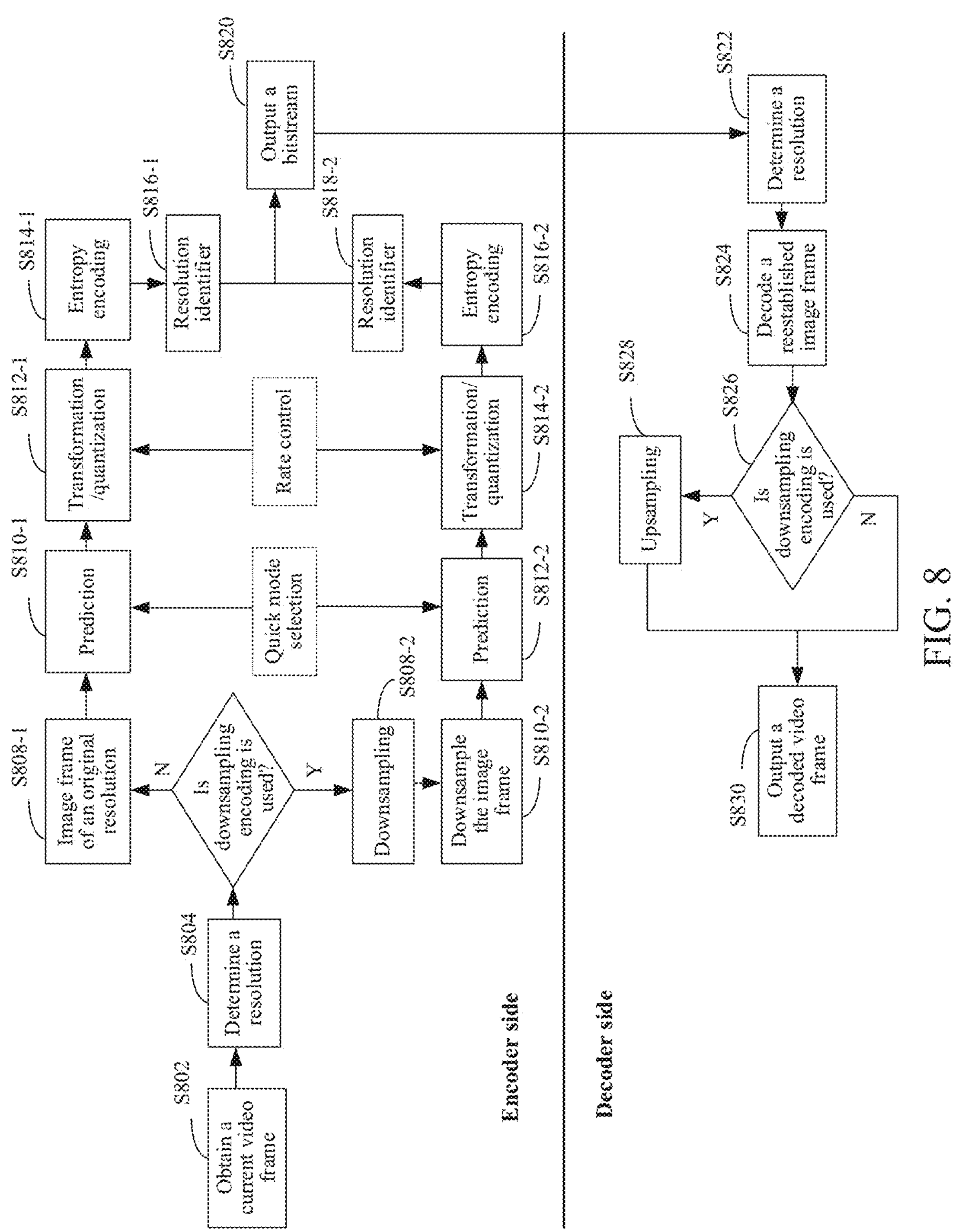
FIG. 8 is a schematic diagram of exemplary video encoding and decoding processes according to an embodiment of this application.

Specifically, a description is provided with reference to S802 to S830 in the example shown in FIG. 8. A current video frame is obtained on an encoder side, and a resolution used for encoding the current video frame is selected by determining a resolution. Subsequently, a current encoding mode is determined from optional encoding modes according to current encoding information and/or image feature information of the current video frame. If the current encoding mode is a full resolution mode, it is determined that downsampling encoding is not required, and step S808-1 to step S816-1 are performed; and intra/inter prediction is performed on an image frame with an original resolution to obtain a prediction residual, transformation/quantization and entropy encoding are performed to obtain encoded data, and a resolution identifier of the used resolution is determined. Further, the data is encoded, and as in step S820, a bitstream is outputted.

If the current encoding mode is a downsampling mode, downsampling is required, and step S810-2 to step S818-2 are performed. A downsampling image frame is obtained, intra/inter prediction is performed on the image frame to obtain a prediction residual, transformation/quantization and entropy encoding are performed, to obtain encoded data, and a resolution identifier of the used resolution is determined. Further, the data is encoded, and as in step S820, a bitstream is outputted.

Subsequently, the bitstream is inputted into the decoder side. For example, step S822 to step S830: adaptively determining a current video frame, to determine a resolution of the current video frame, and then decoding the current video frame to obtain a reestablished video frame. If it is determined that the downsampling mode is used, the reestablished video frame is upsampled, to obtain a decoded video frame, or otherwise, the decoded video frame is directly outputted.

The foregoing is merely an example. The video encoding method and the video decoding method provided in this embodiment are applicable to a resolution determining process shown in the figures and used for adaptively determining resolutions for different current video frames/current video frames on an encoder side and a decoder side, to simplify a process of determining resolutions used for frames during encoding and decoding, thereby achieving the effect of improving the encoding and decoding efficiency.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Figure 9:
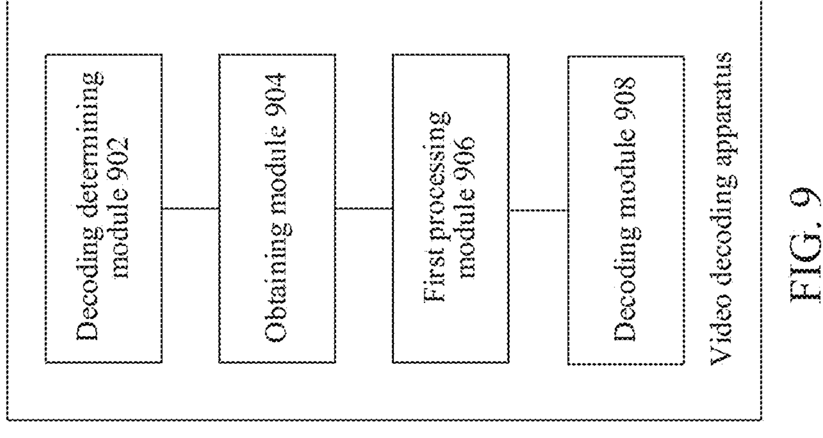
FIG. 9 is a schematic structural diagram of an exemplary video decoding apparatus according to an embodiment of this application.

According to another aspect of the embodiments of this application, a video decoding apparatus for implementing the video decoding method is further provided. As shown in FIG. 9, the apparatus includes:

(1) a decoding determining module 902, configured to determine a current video frame;

(2) an obtaining module 904, configured to: determine a reference frame corresponding to the current video frame from video frames that have been decoded, and obtain a target quantity of blocks that are decoded in a skip mode in the reference frame and a total block quantity of blocks in the reference frame;

(3) a first processing module 906, configured to determine, according to a relationship between the target quantity and the total block quantity, a target resolution used for decoding the current video frame; and (4) a decoding module 908, configured to decode the current video frame by using the target resolution.

For the specific embodiments, reference may be made to the example shown in the foregoing video decoding method, and details are not described herein again in this example.

As an exemplary solution, the first processing module 906 includes:

(1) a first processing submodule, configured to decode the current video frame by using a first resolution when a reciprocal of a ratio of the target quantity to the total block quantity is greater than or equal to a preset threshold; and further configured to decode the current video frame by using a second resolution when the reciprocal of the ratio of the target quantity to the total block quantity is less than the preset threshold, the second resolution being greater than the first resolution.

For the specific embodiments, reference may be made to the example shown in the foregoing video decoding method, and details are not described herein again in this example.

As an exemplary solution, the first processing module further includes:

(1) a first determining submodule, configured to determine, before the current video frame is decoded by using the first resolution, a group of thresholds from a value interval greater than the preset threshold when the reciprocal of the ratio of the target quantity to the total block quantity is greater than or equal to the preset threshold;

(2) a comparison submodule, configured to compare the reciprocal of the ratio of the target quantity to the total block quantity with thresholds included in the group of thresholds;

(3) a second determining submodule, configured to determine a sampling ratio according to a result of the comparison; and (4) a sampling submodule, configured to downsample the second resolution according to the sampling ratio, to determine the first resolution.

For the specific embodiments, reference may be made to the example shown in the foregoing video decoding method, and details are not described herein again in this example.

As an exemplary solution, the obtaining module 904 includes:

(1) a third determining submodule, configured to determine a $(t-k)^{th}$ video frame as one reference frame when the current video frame is a $t^{th}$ video frame; and (2) a first obtaining submodule, configured to obtain the target quantity and the total block quantity from the $(t-k)^{th}$ video frame, k being a predetermined positive integer, t being a positive integer, t being greater than k.

For the specific embodiments, reference may be made to the example shown in the foregoing video decoding method, and details are not described herein again in this example.

As an exemplary solution, the obtaining module 904 includes:

(1) a fourth determining submodule, configured to determine a plurality of reference frames from the video frames that have been decoded; and 2) a second obtaining submodule, configured to obtain the target quantity in the plurality of reference frames and the total block quantity in the plurality of reference frames.

In some embodiments, the fourth determining submodule determines the plurality of reference frames from the video frames that have been decoded by using the following step: determining a plurality of consecutive video frames or a plurality of nonconsecutive video frames from the video frames that have been decoded as the plurality of reference frames.

In some embodiments, the fourth determining submodule determines the plurality of reference frames from the video frames that have been decoded by using the following step: determining a $(t-k1)^{th}$ video frame to a $(t-k2)^{th}$ video frame as the plurality of reference frames when the current video frame is a $t^{th}$ video frame; and the second obtaining submodule obtains the target quantity in the plurality of reference frames and the total block quantity in the plurality of reference frames by using the following step: obtaining the target quantity and the total block quantity from the $(t-k1)^{th}$ video frame to the $(t-k2)^{th}$ video frame, k1 and k2 being predetermined positive integers, t being a positive integer, t being greater than k1, k1 being greater than k2.

For the specific embodiments, reference may be made to the example shown in the foregoing video decoding method, and details are not described herein again in this example.

Figure 10:
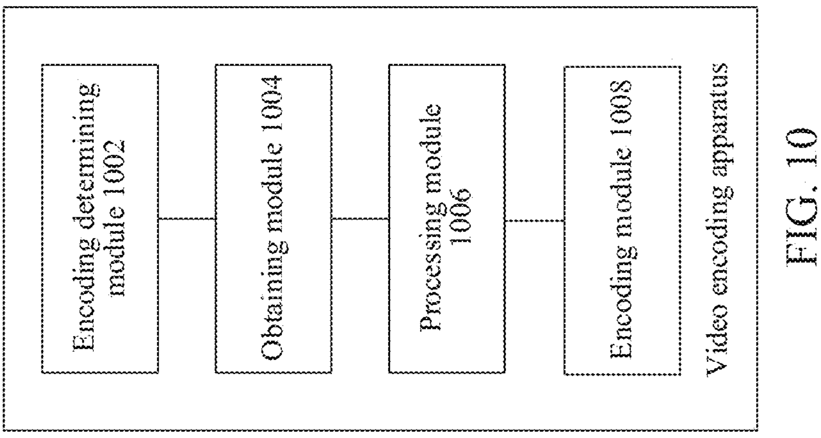
FIG. 10 is a schematic structural diagram of an exemplary video encoding apparatus according to an embodiment of this application.

According to another aspect of the embodiments of this application, a video encoding apparatus for implementing the video encoding method is further provided. As shown in FIG. 10, the apparatus includes:

(1) an encoding determining module 1002, configured to determine a current video frame;

(2) an obtaining module 1004, configured to: determine a reference frame corresponding to the current video frame from video frames that have been encoded, and obtain a target quantity of blocks that are encoded in a skip mode in the reference frame and a total block quantity of blocks in the reference frame;

(3) a processing module 1006, configured to determine, according to a relationship between the target quantity and the total block quantity, a target resolution used for encoding the current video frame; and (4) an encoding module 1008, configured to encode the current video frame by using the target resolution.

For the specific embodiments, reference may be made to the example shown in the foregoing video encoding method, and details are not described herein again in this example.

As an exemplary solution, the processing module 1006 includes:

(1) a first processing submodule, configured to encode the current video frame by using a first resolution when a reciprocal of a ratio of the target quantity to the total block quantity is greater than or equal to a preset threshold; and further configured to encode the current video frame by using a second resolution when the reciprocal of the ratio of the target quantity to the total block quantity is less than the preset threshold, the second resolution being greater than the first resolution.

For the specific embodiments, reference may be made to the example shown in the foregoing video encoding method, and details are not described herein again in this example.

As an exemplary solution, the processing module further includes:

(1) a first determining submodule, configured to determine, before the current video frame is encoded by using the first resolution, a group of thresholds from a value interval greater than the preset threshold when the reciprocal of the ratio of the target quantity to the total block quantity is greater than or equal to the preset threshold;

(2) a comparison submodule, configured to compare the reciprocal of the ratio of the target quantity to the total block quantity with thresholds included in the group of thresholds;

(3) a second determining submodule, configured to determine a sampling ratio according to a result of the comparison; and (4) a sampling submodule, configured to downsample the second resolution according to the sampling ratio, to determine the first resolution.

For the specific embodiments, reference may be made to the example shown in the foregoing video encoding method, and details are not described herein again in this example.

Figure 11:
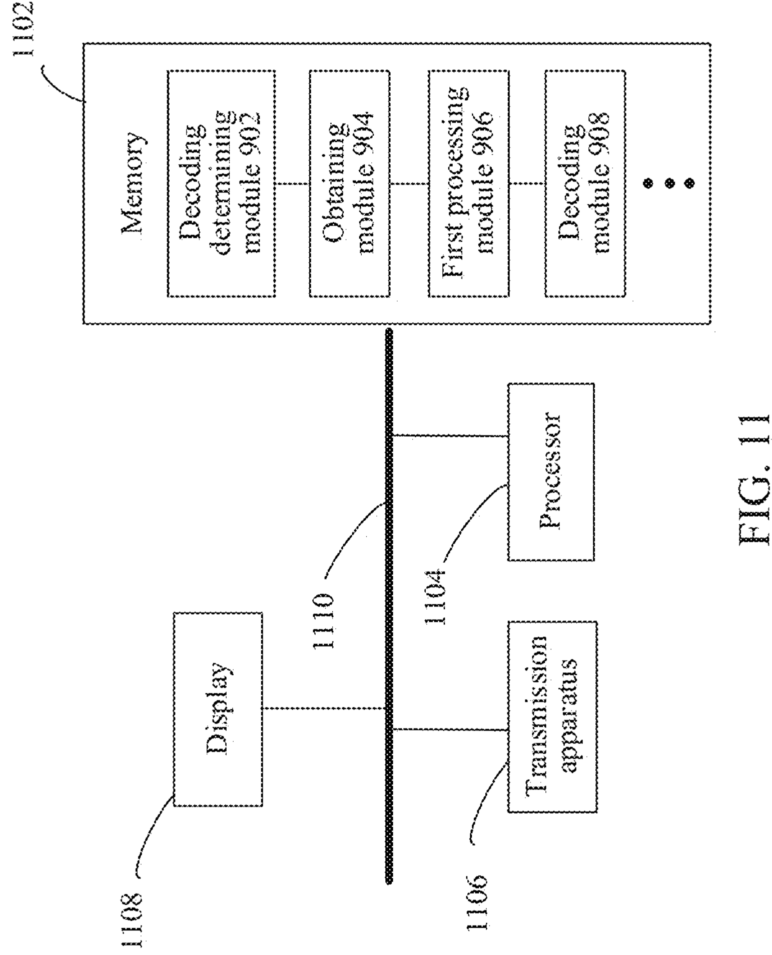
FIG. 11 is a schematic structural diagram of an exemplary electronic device according to an embodiment of this application.

According to yet another aspect of the embodiments of this application, an electronic device for implementing the foregoing video decoding method is further provided. As shown in FIG. 11, the electronic device includes a memory 1102 and a processor 1104. The memory 1102 stores a computer program, and the processor 1104 is configured to perform the steps in any one of the method embodiments by executing the computer program. In this application, the term “unit” or “module” refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In some embodiments, the electronic device may be located in at least one of a plurality of network devices in a computer network.

In some embodiments, the processor may be configured to perform the following steps by executing the computer program.

S1: Determine a current video frame.

S2: Determine a reference frame corresponding to the current video frame from video frames that have been decoded, and obtain a target quantity of blocks that are decoded in a skip mode in the reference frame and a total block quantity of blocks in the reference frame.

S3: Determine, according to a relationship between the target quantity and the total block quantity, a target resolution used for decoding the current video frame.

S4: Decode the current video frame by using the target resolution.

Optionally, a person of ordinary skill in the art may understand that, the structure shown in FIG. 11 is only schematic. The electronic device may be a terminal device such as a smartphone (such as an Android mobile phone or an iOS mobile phone), a tablet computer, a palmtop computer, a Mobile Internet Device (MID), or a PAD. FIG. 11 does not limit the structure of the electronic device. For example, the electronic device may further include more or fewer components (such as a network interface) than those shown in FIG. 11, or have a configuration different from that shown in FIG. 11.

The memory 1102 may be configured to store a software program and a module, for example, a program instruction/module corresponding to the video decoding method and apparatus in the embodiments of this application, and the processor 1104 performs various functional applications and data processing by running a software program and a module stored in the memory 1102, that is, implementing the foregoing video decoding method. The memory 1102 may include a high-speed random access memory, and may also include a non-volatile memory, for example, one or more magnetic storage apparatuses, a flash memory, or another non-volatile solid-state memory. In some embodiments, the memory 1102 may further include memories remotely disposed relative to the processor 1104, and the remote memories may be connected to a terminal through a network. Examples of the network include, but are not limited to, the Internet, an intranet, a local area network, a mobile communication network, and a combination thereof. The memory 1102 may be specifically configured to, but is not limited to, store information such as a current video frame. As an example, as shown in FIG. 11, the memory 1102 may include, but is not limited to, the decoding determining module 902, the obtaining module 904, the first processing module 906, and the decoding module 908 in the video decoding apparatus. In addition, the memory may further include, but is not limited to, other modules and units in the foregoing video decoding apparatus. Details are not described in this example again.

In some embodiments, the foregoing transmission apparatus 1106 is configured to receive or transmit data through a network. Specific examples of the foregoing network may include a wired network and a wireless network. In an example, the transmission apparatus 1106 includes a network interface controller (NIC). The NIC may be connected to another network device and a router by using a network cable, so as to communicate with the Internet or a local area network. In an example, the transmission apparatus 1106 is a radio frequency (RF) module, which communicates with the Internet in a wireless manner.

In addition, the electronic device further includes: a display 1108, configured to display a decoded video; and a connection bus 1110, configured to connect various module components in the electronic device.

Figure 12:
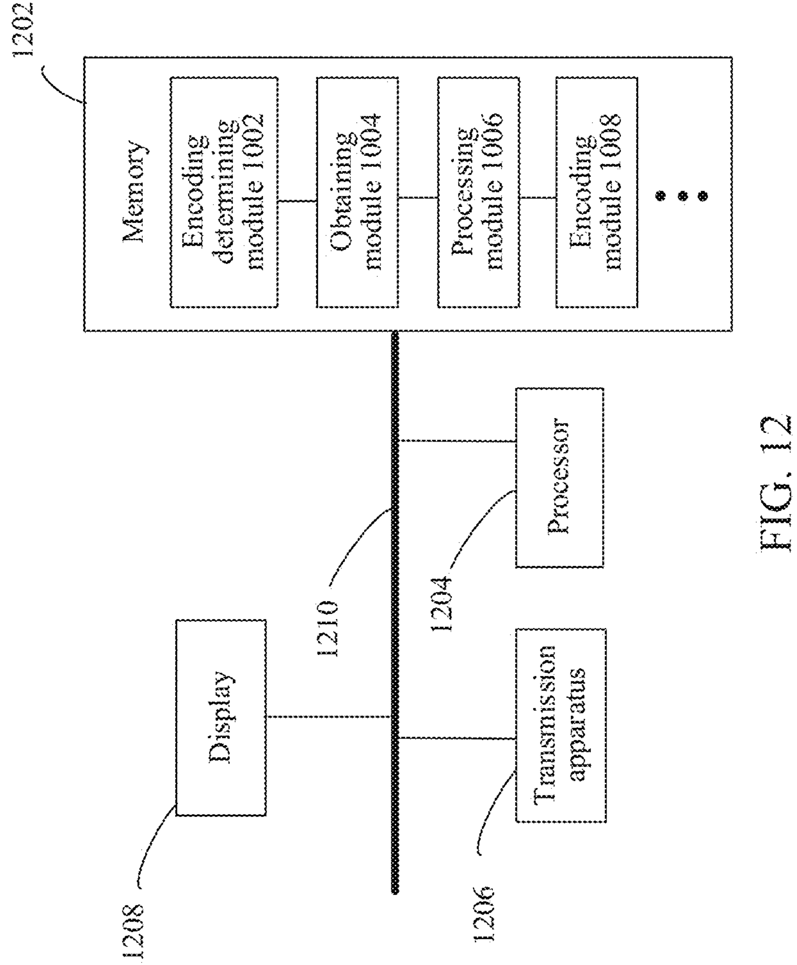
FIG. 12 is a schematic structural diagram of another exemplary electronic device according to an embodiment of this application.

According to yet another aspect of the embodiments of this application, an electronic device for implementing the foregoing video encoding method is further provided. As shown in FIG. 12, the electronic device includes a memory 1202 and a processor 1204. The memory 1202 stores a computer program, and the processor 1204 is configured to perform the steps in any one of the method embodiments by executing the computer program.

In some embodiments, the electronic device may be located in at least one of a plurality of network devices in a computer network.

In some embodiments, the processor may be configured to perform the following steps by executing the computer program.

S1: Determine a current video frame.

S2: Determining a reference frame corresponding to the current video frame from video frames that have been encoded, and obtain a target quantity of blocks that are encoded in a skip mode in the reference frame and a total block quantity of blocks in the reference frame.

S3: Determine, according to a relationship between the target quantity and the total block quantity, a target resolution used for encoding the current video frame.

S4: Encode the current video frame by using the target resolution.

In some embodiments, a person of ordinary skill in the art may understand that, the structure shown in FIG. 12 is only schematic. The electronic device may be a terminal device such as a smartphone (such as an Android mobile phone or an iOS mobile phone), a tablet computer, a palmtop computer, a MID, or a PAD. FIG. 12 does not limit the structure of the electronic device. For example, the electronic device may further include more or fewer components (such as a network interface) than shown in FIG. 12, or have a configuration different from that shown in FIG. 12.

The memory 1202 may be configured to store a software program and a module, for example, a program instruction/module corresponding to the video encoding method and apparatus in the embodiments of this application, and the processor 1204 performs various functional applications and data processing by running a software program and a module stored in the memory 1202, that is, implementing the foregoing video encoding method. The memory 1202 may include a high-speed random access memory, and may also include a non-volatile memory, for example, one or more magnetic storage apparatuses, a flash memory, or another non-volatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may be specifically configured to, but is not limited to, information such as a current video frame. As an example, as shown in FIG. 12, the memory 1202 may include, but is not limited to, the encoding determining module 1002, the obtaining module 1004, the processing module 1006, and the encoding module 1008 in the video encoding apparatus. In addition, the memory may further include, but is not limited to, other modules and units in the foregoing video encoding apparatus. Details are not described in this example again.

In some embodiments, the foregoing transmission apparatus 1206 is configured to receive or transmit data through a network. Specific examples of the foregoing network may include a wired network and a wireless network. In an example, the transmission apparatus 1206 includes a NIC. The NIC may be connected to another network device and a router by using a network cable, so as to communicate with the Internet or a local area network. In an example, the transmission apparatus 1206 is an RF module, which communicates with the Internet in a wireless manner.

In addition, the electronic device further includes: a display 1208, configured to display a video before being encoded; and a connection bus 1210, configured to connect various module components in the electronic device.

According to still another aspect of the embodiments of this application, a computer-readable storage medium is further provided. The computer-readable storage medium stores a computer program, the computer program being configured to perform steps in any one of the foregoing method embodiments when being run.

In some embodiments, the computer-readable storage medium may be configured to store a computer program configured to perform the following steps:

S1: Determine a current video frame in a current video.

S2: Determine a reference frame corresponding to the current video frame from video frames that have been decoded before the current video frame, and obtain a target quantity of blocks that are decoded in a skip mode in the reference frame and a total block quantity of blocks in the reference frame.

S3: Determine, according to a relationship between the target quantity and the total block quantity, a target resolution used for decoding the current video frame, the target resolutions determined according to different relationships being different.

S4: Decode the current video frame by using the target resolution.

In some embodiments, the computer-readable storage medium may be further configured to store a computer program configured to perform the following steps:

S1: Determine a current video frame.

S2: Determine a reference frame corresponding to the current video frame from video frames that have been encoded, and obtain a target quantity of blocks that are encoded in a skip mode in the reference frame and a total block quantity of blocks in the reference frame.

S3: Determine, according to a relationship between the target quantity and the total block quantity, a target resolution used for encoding the current video frame.

S4: Encode the current video frame by using the target resolution.

In some embodiments, the storage medium is further configured to store a computer program used for performing the steps included in the methods according to the foregoing embodiments, and details are not described again in this embodiment.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

In addition, the embodiments of this application further provide a storage medium, the storage medium being configured to store a computer program, the computer program being configured to perform the method in the foregoing embodiments.

An embodiment of this application further provides a computer program product including instructions, the instructions, when run on a computer, causing the computer to perform the method according to the foregoing embodiments.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A video decoding method performed by an electronic device, the method comprising:

determining a current video frame;

obtaining a target quantity of blocks that are decoded in a skip mode in a reference frame corresponding to the current video frame and a total block quantity of blocks in the reference frame;

determining a target resolution used for decoding the current video frame according to a ratio of the total block quantity to the target quantity, further including:

determining a first resolution as the target resolution for decoding the current video frame when the ratio of the total block quantity to the target quantity is greater than or equal to a preset threshold; and determining a second resolution as the target resolution for decoding the current video frame when the ratio of the total block quantity to the target quantity is no greater than the preset threshold, the second resolution being greater than the first resolution; and decoding the current video frame by using the target resolution.

2. The method according to claim 1, wherein the method further comprises:

before decoding the current video frame:

determining a group of thresholds from a value interval greater than the preset threshold when the ratio of the total block quantity to the target quantity is greater than the preset threshold;

comparing the ratio of the total block quantity to the target quantity with thresholds comprised in the group of thresholds;

determining a sampling ratio according to a result of the comparison; and downsampling the second resolution according to the sampling ratio, to determine the first resolution.

3. The method according to claim 1, wherein the obtaining a target quantity of blocks that are decoded in a skip mode in a reference frame corresponding to the current video frame and a total block quantity of blocks in the reference frame comprises:

determining a video frame (t−k) as one reference frame when the current video frame is a video frame t, wherein k is a predetermined positive integer and t is a positive integer greater than k; and obtaining the target quantity and the total block quantity from the video frame (t−k).

4. The method according to claim 1, wherein the obtaining a target quantity of blocks that are decoded in a skip mode in a reference frame corresponding to the current video frame and a total block quantity of blocks in the reference frame comprises:

determining a plurality of reference frames from the video frames that have been decoded; and obtaining the target quantity in the plurality of reference frames and the total block quantity in the plurality of reference frames.

5. The method according to claim 4, wherein the determining a plurality of reference frames from the video frames that have been decoded comprises:

determining a plurality of consecutive video frames or a plurality of nonconsecutive video frames from the video frames that have been decoded as the plurality of reference frames.

6. The method according to claim 1, wherein the target resolution is further determined in the following manner:

parsing a bitstream to obtain a decoding flag bit corresponding to the current video frame; and obtaining the target resolution indicated by the decoding flag bit.

7. An electronic device, comprising:

a processor, a communication interface, a memory, and a communication bus, the processor, the communication interface, and the memory communicating with each other by using the communication bus; the communication interface being an interface of a communication module;

the memory storing computer-readable instructions, wherein the computer-readable instructions, when executed by the processor, cause the electronic device to perform a video decoding method including:

determining a current video frame;

obtaining a target quantity of blocks that are decoded in a skip mode in a reference frame corresponding to the current video frame and a total block quantity of blocks in the reference frame;

determining a target resolution used for decoding the current video frame according to a ratio of the total block quantity to the target quantity, further including:

determining a first resolution as the target resolution for decoding the current video frame when the ratio of the total block quantity to the target quantity is greater than or equal to a preset threshold; and determining a second resolution as the target resolution for decoding the current video frame when the ratio of the total block quantity to the target quantity is no greater than the preset threshold, the second resolution being greater than the first resolution; and decoding the current video frame by using the target resolution.

8. The electronic device according to claim 7, wherein the method further comprises:

before decoding the current video frame:

determining a group of thresholds from a value interval greater than the preset threshold when the ratio of the total block quantity to the target quantity is greater than the preset threshold;

comparing the ratio of the total block quantity to the target quantity with thresholds comprised in the group of thresholds;

determining a sampling ratio according to a result of the comparison; and downsampling the second resolution according to the sampling ratio, to determine the first resolution.

9. The electronic device according to claim 7, wherein the obtaining a target quantity of blocks that are decoded in a skip mode in a reference frame corresponding to the current video frame and a total block quantity of blocks in the reference frame comprises:

determining a video frame (t−k) as one reference frame when the current video frame is a video frame t, wherein k is a predetermined positive integer and tis a positive integer greater than k; and obtaining the target quantity and the total block quantity from the video frame (t−k).

10. The electronic device according to claim 7, wherein the obtaining a target quantity of blocks that are decoded in a skip mode in a reference frame corresponding to the current video frame and a total block quantity of blocks in the reference frame comprises:

determining a plurality of reference frames from the video frames that have been decoded; and obtaining the target quantity in the plurality of reference frames and the total block quantity in the plurality of reference frames.

11. The electronic device according to claim 10, wherein the determining a plurality of reference frames from the video frames that have been decoded comprises:

determining a plurality of consecutive video frames or a plurality of nonconsecutive video frames from the video frames that have been decoded as the plurality of reference frames.

12. The electronic device according to claim 7, wherein the target resolution is further determined in the following manner:

parsing a bitstream to obtain a decoding flag bit corresponding to the current video frame; and obtaining the target resolution indicated by the decoding flag bit.

13. A non-transitory computer-readable storage medium storing computer-readable instructions, wherein the computer-readable instructions, when executed by a processor of an electronic device, cause the electronic device to perform a video decoding method including:

determining a current video frame;

obtaining a target quantity of blocks that are decoded in a skip mode in a reference frame corresponding to the current video frame and a total block quantity of blocks in the reference frame;

determining a target resolution used for decoding the current video frame according to a ratio of the total block quantity to the target quantity, further including:

determining a first resolution as the target resolution for decoding the current video frame when the ratio of the total block quantity to the target quantity is greater than or equal to a preset threshold; and determining a second resolution as the target resolution for decoding the current video frame when the ratio of the total block quantity to the target quantity is no greater than the preset threshold, the second resolution being greater than the first resolution; and decoding the current video frame by using the target resolution.

14. The non-transitory computer-readable storage medium according to claim 13, wherein the method further comprises:

before decoding the current video frame:

determining a group of thresholds from a value interval greater than the preset threshold when the ratio of the total block quantity to the target quantity is greater than the preset threshold;

comparing the ratio of the total block quantity to the target quantity with thresholds comprised in the group of thresholds;

determining a sampling ratio according to a result of the comparison; and downsampling the second resolution according to the sampling ratio, to determine the first resolution.

15. The non-transitory computer-readable storage medium according to claim 13, wherein the obtaining a target quantity of blocks that are decoded in a skip mode in a reference frame corresponding to the current video frame and a total block quantity of blocks in the reference frame comprises:

determining a video frame (t−k) as one reference frame when the current video frame is a video frame t, wherein k is a predetermined positive integer and t is a positive integer greater than k; and obtaining the target quantity and the total block quantity from the video frame (t−k).

16. The non-transitory computer-readable storage medium according to claim 15, wherein the obtaining a target quantity of blocks that are decoded in a skip mode in a reference frame corresponding to the current video frame and a total block quantity of blocks in the reference frame comprises:

determining a plurality of reference frames from the video frames that have been decoded; and obtaining the target quantity in the plurality of reference frames and the total block quantity in the plurality of reference frames.

17. The non-transitory computer-readable storage medium according to claim 16, wherein the determining a plurality of reference frames from the video frames that have been decoded comprises:

determining a plurality of consecutive video frames or a plurality of nonconsecutive video frames from the video frames that have been decoded as the plurality of reference frames.

* * * * *